United States Patent
Radhakrishnan et al.

(10) Patent No.: US 10,489,175 B2
(45) Date of Patent: Nov. 26, 2019

(54) PRE-CONFIGURE AND PRE-LAUNCH COMPUTE RESOURCES

(71) Applicant: Amazon Technologies, Inc., Reno, NV (US)

(72) Inventors: Arjun Radhakrishnan, Cape Town (ZA); Christopher Richard Jacques de Kadt, Cape Town (ZA); James Alfred Gordon Greenfield, Cape Town (ZA); Jacobus Johannes Nicolaas van der Merwe, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/914,225

(22) Filed: Jun. 10, 2013

(65) Prior Publication Data

US 2014/0365626 A1 Dec. 11, 2014

(51) Int. Cl.
*G06F 15/177* (2006.01)
*G06F 9/455* (2018.01)
(Continued)

(52) U.S. Cl.
CPC ........ *G06F 9/45558* (2013.01); *G06F 9/5027* (2013.01); *G06F 9/5033* (2013.01);
(Continued)

(58) Field of Classification Search
CPC ............. H04L 41/0806; H04L 67/1002; G06F 2009/4557; G06F 2009/45562;
(Continued)

(56) References Cited

U.S. PATENT DOCUMENTS 8,417,578 B1 * 4/2013 Evans ................... G06Q 30/00
   705/26.1
8,424,007 B1 * 4/2013 Hernacki ............... G06F 9/485
   718/103

(Continued)

FOREIGN PATENT DOCUMENTS

CN 102611734 A 7/2012
JP 2008-269250 A 11/2008
(Continued)

OTHER PUBLICATIONS

International Patent Application No. PCT/US2014/041794; Int'l Preliminary Report on Patentability; dated Dec. 15, 2015; 6 pages.
(Continued)

*Primary Examiner* — June Y Sison
*Assistant Examiner* — Dixon F Dabipi
(74) *Attorney, Agent, or Firm* — BakerHostetler

(57) ABSTRACT

Systems, methods and computer-readable media are described for pre-warming compute instances in datacenters. A service provider associated with the datacenters may expect a demand for the compute instances and pre-configure computing resources within the datacenters to pre-launch the compute instances. As such, when a user requests a compute instance, the service provider may satisfy the request by allocating a pre-warmed compute instance to the user.

21 Claims, 9 Drawing Sheets

(51) Int. Cl.
*H04L 12/24* (2006.01)
*H04L 29/08* (2006.01)
*G06F 9/50* (2006.01)
*G06F 8/61* (2018.01)

(52) U.S. Cl.
CPC ...... *H04L 41/5054* (2013.01); *H04L 41/5096* (2013.01); *H04L 67/1002* (2013.01); *G06F 8/63* (2013.01); *G06F 2009/4557* (2013.01); *G06F 2009/45562* (2013.01); *G06F 2209/5014* (2013.01); *H04L 41/0816* (2013.01)

(58) Field of Classification Search
CPC ...... G06F 9/5027; G06F 9/505; G06F 9/5055; G06F 2209/5014
USPC ........................................................ 709/222
See application file for complete search history.

(56) References Cited

U.S. PATENT DOCUMENTS

| | | | | |
|---|---|---|---|---|
| 8,560,699 | B1* | 10/2013 | Theimer | G06F 9/44505 705/26.1 |
| 8,793,684 | B2 | 7/2014 | Breitgand et al. | |
| 8,826,277 | B2 | 9/2014 | Chang et al. | |
| 9,298,443 | B2* | 3/2016 | Dias de Assuncao | G06F 8/63 |
| 2005/0144282 | A1* | 6/2005 | Argo | H04L 12/4641 709/226 |
| 2010/0232594 | A1 | 9/2010 | Lawson et al. | |
| 2010/0281102 | A1* | 11/2010 | Chinta | G06F 21/53 709/203 |
| 2012/0147894 | A1* | 6/2012 | Mulligan | G06F 9/45533 370/395.53 |
| 2012/0240110 | A1* | 9/2012 | Breitgand | G06F 9/45558 718/1 |
| 2013/0139152 | A1* | 5/2013 | Chang | G06F 9/45545 718/1 |
| 2014/0215049 | A1* | 7/2014 | Provaznik | H04L 41/0663 709/224 |

FOREIGN PATENT DOCUMENTS

| | | |
|---|---|---|
| JP | 2009-163440 A | 7/2009 |
| JP | 2013-516715 A | 5/2013 |
| JP | 2016-527604 A | 9/2016 |
| WO | WO 2011/085335 A2 | 7/2011 |
| WO | WO 2014/201053 A1 | 12/2014 |

OTHER PUBLICATIONS

Singapore Patent Application No. 11201510128U; Written Opinion; dated Jul. 7, 2016; 5 pages.
Yamasaki et al.; "Model-Based Resource Selection for Efficient Virtual Cluster Deployment"; Virtualization Technology in Distributed Computing; Nov. 2007; 7 pages.
Krsul et al.; "VMPlants: Providing and Managing Virtual Machine Execution Environments for Grid Computing"; Supercomputing—Proceedings of the ACM/IEEE; Nov. 2004; 12 pages.
Keahy et al.; "Virtual Workspaces in the Grid"; Parallel Processing: 11$^{th}$ Int'l Euro-Par Conf.; 2005; p. 421-430.
Zhu et al.; "Twinkle: A Fast Resource Provisioning Mechanism for Internet Services"; Infocom—IEEE Proceedings; 2011; p. 802-810.
European Patent Application No. 14811722.9; Extended Search Report; dated Feb. 1, 2017; 11 pages.

* cited by examiner

PRE-CONFIGURE AND PRE-LAUNCH COMPUTE RESOURCES

BACKGROUND

Service providers provide computing resources to various entities, such as corporations, universities, government agencies and other types of customers. The services offered by the service providers allow the entities flexibility in resource allocation, improved scalability, reduced operating costs and so on.

Service providers typically provide computing resources in the form of instances. The instances are sometimes implemented as virtual machines, virtual machine instances or the like. The ability to provide computing resources in the form of instances allows the service providers to dynamically scale the computing resources available to meet the needs and requirements of the various entities that use the services.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
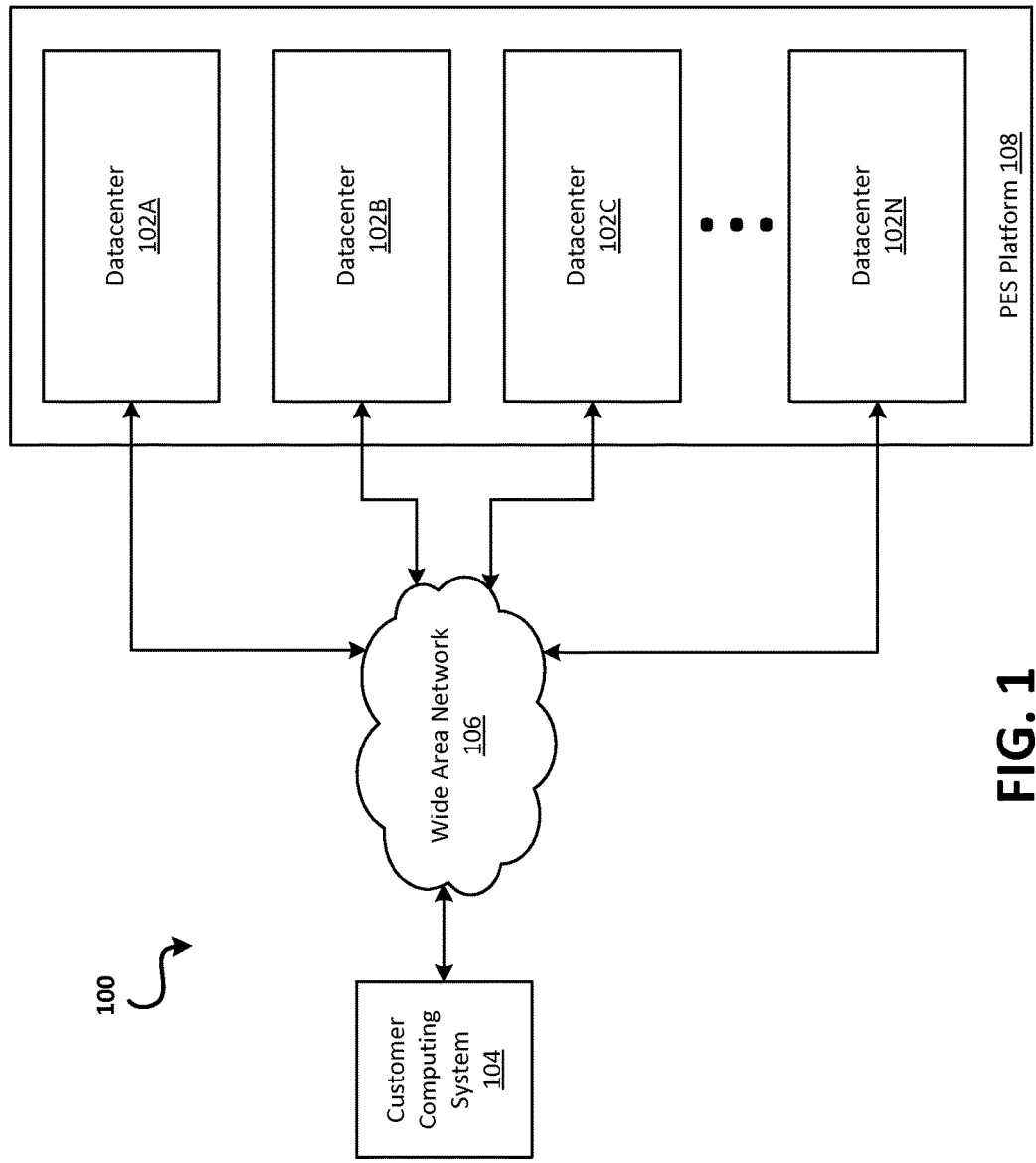
FIG. 1 illustrates an example operating environment of datacenters, according to embodiments.

As noted above, service providers dynamically provide computing resources to entities, usually in the form of computing instances. For the most part, the entities, which are referred to herein interchangeably as customers, i.e., customers of the service providers, provide input to the service providers to define the type and configuration of the computing instances desired as well as to provide information regarding when the computing instances are needed by the customers. All of this input information is used by a service operated by the service provider to configure and launch computing instances. The launch process generally occurs on demand and is reactive to customer needs. However, the launch process is not instantaneous or even near instantaneous. Rather, a customer may experience a noticeable time delay between the time that the launch is requested and the time that the instance is ready for use by the customer. The time delay experienced by the customer can be on the order of minutes as a result of the service configuring its computing resources and launching the instance. That amount of time delay can impact the customer experience.

To improve the customer experience, a service provider can analyze a history of instance requests and use the information to determine an expected demand of instances. This expected demand information can include, for example, the number and types of instances that the service provider expects its customers to request. Based on the expected demand information, the service provider can pre-configure computing resources and provision compute instances on the pre-configured computing resources to reduce the time that it takes from when a customer requests an instance to when the instance is available to the customer to use. When the service provider receives a request from a computing device of a customer to launch an instance of a particular configuration, the service provider services the request by allocating an instance from the provisioned instances. Since the provisioned instances may be pre-configured and pre-positioned on a computing resource, the customer may only need to wait for control of the instance to be transferred to the customer or for the instance to be activated (e.g., resumed from an idled state or booted up from a cached image) to connect to it.

Further detail about pre-configuring the instances and the computing resources of the service is provided herein. It should be appreciated that the subject matter presented herein may be implemented as a computer process, a computer-controlled apparatus, a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

A compute node, which may be referred to also as a computing node, may be implemented on a wide variety of computing environments, such as commodity-hardware computers, virtual machines, computing clusters and computing appliances. Any of these computing devices or environments may, for convenience, be described as compute nodes.

FIG. 1 illustrates an example of a suitable computing environment in which the embodiments described herein may be implemented. A service provider may configure the illustrated computing environment to virtualize compute resources and launch instances for its customers. In particular, FIG. 1 is a system and network diagram that shows an illustrative operating environment 100 that includes a programmable execution service ("PES") platform 108, which may be referred to as PES 108, for providing on-demand access to instances. PES platform 108 can provide compute resources for executing applications on a permanent or an as-needed basis and may be configured as a private network. These compute resources may include various types of resources, such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and so on. Data storage resources may include file storage devices, block storage devices and so on.

Each type or configuration of compute resource may be available in different sizes, such as large resources consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

The compute resources provided by PES platform 108 may be enabled by one or more datacenters 102A, 102B, 102C, . . . , 102N, which may be referred herein singularly as "datacenter 102" or in the plural as "datacenters 102." Datacenters 102 may be facilities that house and operate computer systems and associated components and may include redundant and backup power, communications, cooling and security systems. Datacenters 102 may be located in a same geographical area, such as in a same facility, and may be interconnected using private networks, such as high-speed fiber optic networks, controlled and managed by a service provider of PES platform 108. Datacenters 102 may also be distributed across geographically disparate locations and may be interconnected in part using public networks, such as the Internet. One illustrative configuration for datacenter 102 that implements the concepts and technologies disclosed herein is described below with regard to FIG. 2.

Customers of PES platform 108 may access the compute resources provided by datacenters 102 over a wide-area network ("WAN") 106. Although a WAN is illustrated in FIG. 1, it should be appreciated that a local-area network ("LAN"), the Internet, or any other networking topology and network connections known in the art that connects datacenters 102 to remote customers and other users may be utilized. It should also be appreciated that combinations of such networks may also be utilized.

A customer of PES platform 108 may utilize a computing system 104 to access the compute resources provided by datacenters 102. Customer computing system 104 (which may also be referred to as "customer node," "user node" or the like) may be a computer capable of accessing PES platform 108, such as a server computer, a desktop or laptop personal computer, a tablet computer, a wireless telephone, a PDA, an e-reader, a game console, a set-top box or any other computing device.

As is described in greater detail below, customer computing system 104 may be utilized to configure aspects of the compute resources provided by PES platform 108. In this regard, PES platform 108 may provide a Web interface through which aspects of its operation may be configured through the use of a Web browser application program executing on customer computing system 104. Alternatively, a stand-alone application program executing on customer computing system 104 may access an application programming interface ("API") exposed by PES platform 108 for performing the configuration operations. Other mechanisms for configuring the operation of PES platform 108, including launching new virtual machine instances on PES platform 108, may also be utilized.

According to embodiments disclosed herein, capacities of purchased compute resources provided by PES platform 108 can be scaled in response to demand. In this regard, scaling refers to the process of instantiating, which may also be referred to herein as "launching" or "creating," or "terminating," which may also be referred to herein as "descaling," instances of compute resources in response to demand.

Auto scaling may be one mechanism for scaling compute resources in response to increases or lulls in demand for the resources. Auto scaling may allow customers of PES platform 108 to scale their purchased compute resources according to conditions defined by the customer. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by a customer or when instances are launched by an auto scaling component in PES platform 108.

PES platform 108 may also be configured with a deployment component to assist customers in the deployment of new instances of compute resources. The deployment component may receive a configuration from a customer that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the customer-provided configuration and cache warming logic to launch, configure and prime new instances of compute resources.

Figure 2:
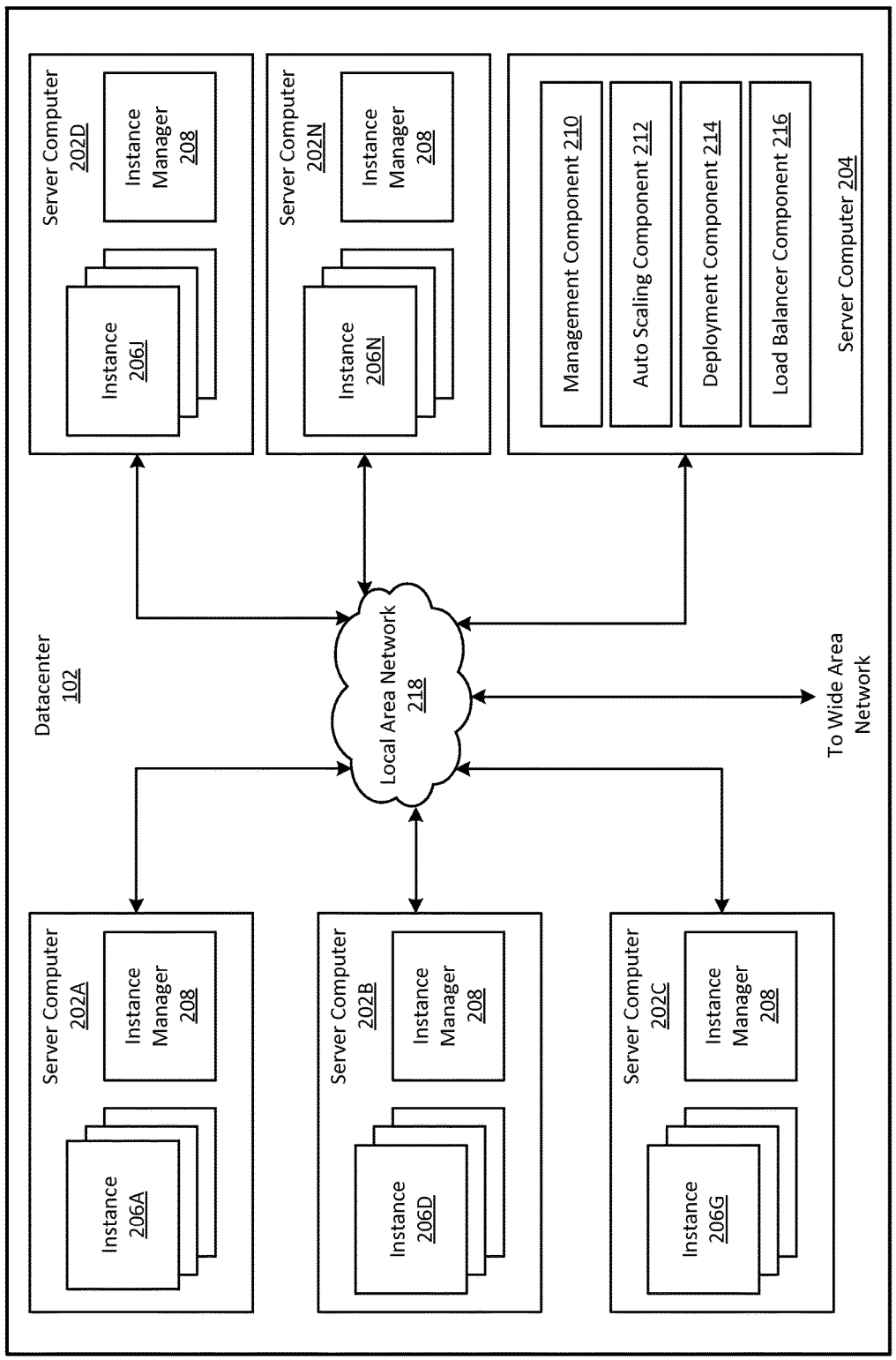
FIG. 2 illustrates an example configuration of a datacenter, according to embodiments.

FIG. 2 is a computing system diagram that illustrates one configuration for datacenter 102 that implements PES platform 108. The example datacenter 102 shown in FIG. 2 may include several server computers 202A, 202B, 202C, 202D, . . . , 202N, which may be referred herein singularly as "server computer 202" or in the plural as "server computers 202," for providing compute resources for hosting instances and for executing applications. Server computers 202 may be standard tower or rack-mount server computers configured appropriately for providing the compute resources described above. For instance, in one implementation server computers 202 may be configured to provide instances 206A, . . . , 206D, . . . , 206G, . . . , 206J, . . . , 206N of compute resources, which may be referred herein singularly as "instance 206" or in the plural as "instances 206."

Instances 206 may be virtual machine instances. As known in the art, a virtual machine instance is an instance of a software implementation of a machine (i.e., a computer) that executes programs like a physical machine. A server can use an image of the machine (e.g., operating system, application server and applications) to launch the virtual machine instance. This image, which may also be referred to as a machine image, is a template that contains a software configuration and all information necessary to boot the instance. In the example of virtual machine instances, each server 202 may be configured to execute an instance manager 208 capable of executing the instances. Instance manager 208 may be a hypervisor or another type of program configured to enable the execution of multiple instances 206 on a single server 202, for example. As discussed above, each of instances 206 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources, which may all be referred to as compute instances. The embodiments disclosed herein may also execute all or a portion of an application directly on a computer system without utilizing virtual machine instances.

Datacenter 102 shown in FIG. 2 may also include one or more server computers 204 (which may be referred to in the singular as "server computer 204" or in the plural as "server computers 204") reserved for executing software components for managing the operation of datacenter 102, server computers 202 and instances 206. In particular, server computer 204 may execute a management component 210. As discussed above, a customer of PES platform 108 may utilize customer computing system 104 to access management component 210 to configure various aspects of the operation of PES platform 108 and instances 206 purchased by the customer. For example, the customer may purchase instances and define and make changes to the configuration of the instances. The configuration of the instances can include parameters that specify operating systems, application server, applications and the like of machine images that the datacenter 102 uses to launch the compute instances. The customer may also provide requests to launch instances to management component 210 and may specify settings regarding how the purchased instances are to be scaled in response to demand.

As also described briefly above, an auto scaling component 212 may scale instances 206 based upon rules defined by a customer of PES platform 108. For example, auto scaling component 212 may allow a customer to specify scale up rules for use in determining when new instances should be instantiated and scale down rules for use in determining when existing instances should be terminated.

Auto scaling component 212 may execute on a single server computer 204 or in parallel across multiple server computers 202 in PES platform 108. In addition, auto scaling component 212 may consist of a number of sub-components executing on different server computers 202 or other computing devices in PES platform 108. Auto scaling component 212 may be implemented as software, hardware or any combination of the two. Auto scaling component 212 may monitor available compute resources in PES platform 108 over an internal management network, for example.

As discussed briefly above, datacenter 102 may also be configured with a deployment component 214 to assist customers in the deployment of new instances 206 of compute resources. Deployment component 214 may receive a configuration from a customer that includes data describing how new instances 206 should be configured. For example, the configuration may specify one or more applications that should be installed in new instances 206, provide scripts and/or other types of code to be executed for configuring new instances 206, provide cache warming logic specifying how an application cache should be prepared, and other types of information. In another example, the configuration information received from the customer may include identifiers of machine images and types of new instances 206.

Deployment component 214 may utilize the customer-provided configuration and cache warming logic to configure, prime and launch new instances 206. The configuration, cache warming logic and other information may be specified by a customer using management component 210 or by providing this information directly to deployment component 214. Other mechanisms may also be utilized to configure the operation of deployment component 214. For example, deployment component 214 may launch new instances 206 based on the identifiers of the machine images and based on a computing resource (e.g., server computer 202) configured to host instances of the types of new instances 206.

Datacenter 102 may also execute a load balancer component 216 to distribute the execution of the instances across the server computers. Load balancer component 216 may be an application within deployment component 214, management component 210 or may be executed on a server other than server computer 204. In an example, load balancer component 216 receives instructions from deployment component 214, determines resources available within datacenter 102, and distributes the instances on the available resources such that no resource is overused or underused and thus the instances are protected against a single point of failure within the datacenter 102.

In the example datacenter 102 shown in FIG. 2, an appropriate LAN 218 may be utilized to interconnect server computers 202 and server computer 204. LAN 218 may be also connected to WAN 106 illustrated in FIG. 1. It should be appreciated that the network topology illustrated in FIGS. 1 and 2 has been greatly simplified and that many more networks, network connections and networking devices may be utilized to interconnect the various computing systems disclosed herein. Appropriate load balancing devices or software modules may also be utilized for balancing a load between each of datacenters 102, between each of server computers 202 in each datacenter 102 and between instances 206 purchased by each customer of PES platform 108. These network topologies and devices should be apparent to those skilled in the art.

It should be appreciated that datacenter 102 described in FIG. 2 is merely illustrative and that other implementations may be utilized. In particular, functionality described herein as being performed by management component 210, auto scaling component 212, deployment component 214 and load balancer component 216, may be performed by one another, may be performed by other components or may be performed by a combination of these or other components. Further, each one of these components may be implemented as a service internal to the programmable execution service PES 108. Additionally, it should be appreciated that this functionality may be implemented in software, hardware or a combination of software and hardware. Other implementations should be apparent to those skilled in the art.

Figure 3:
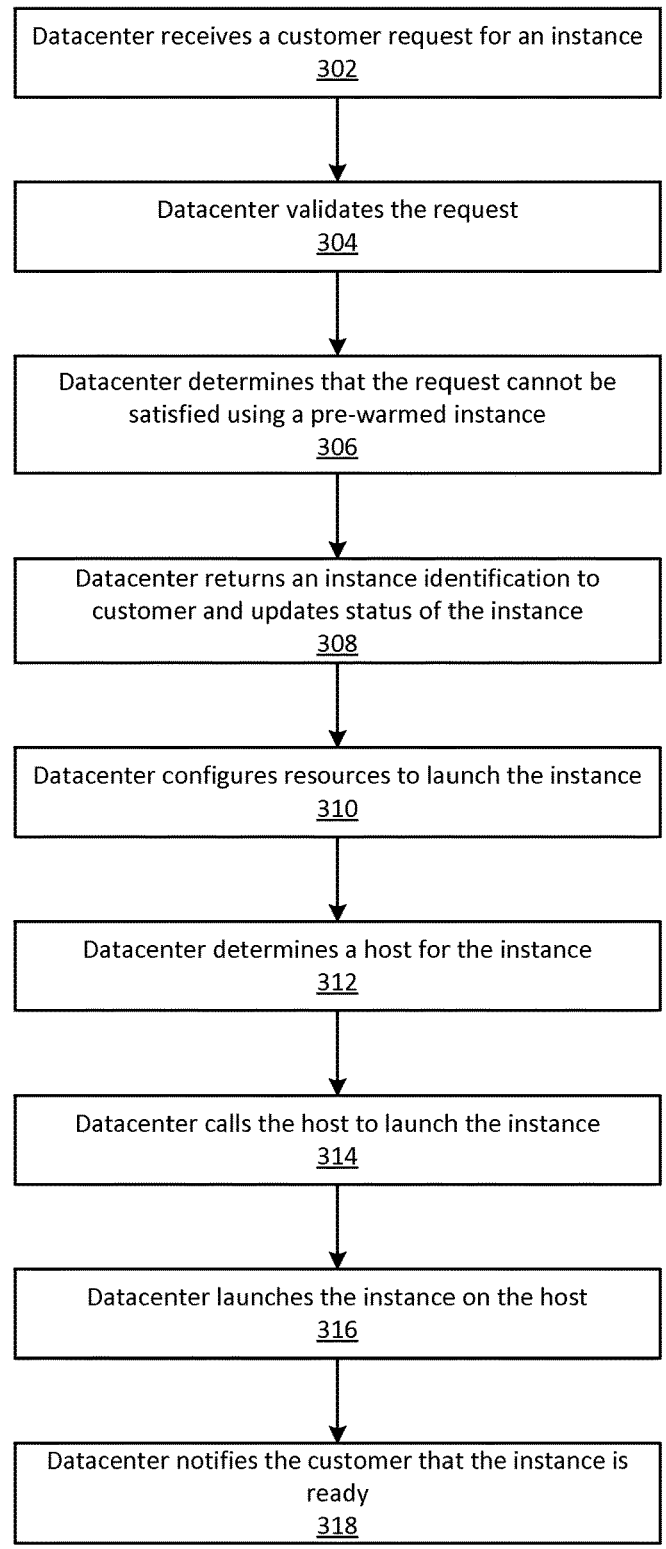
FIG. 3 is a flowchart depicting an example procedure for launching an instance.
Figure 4:
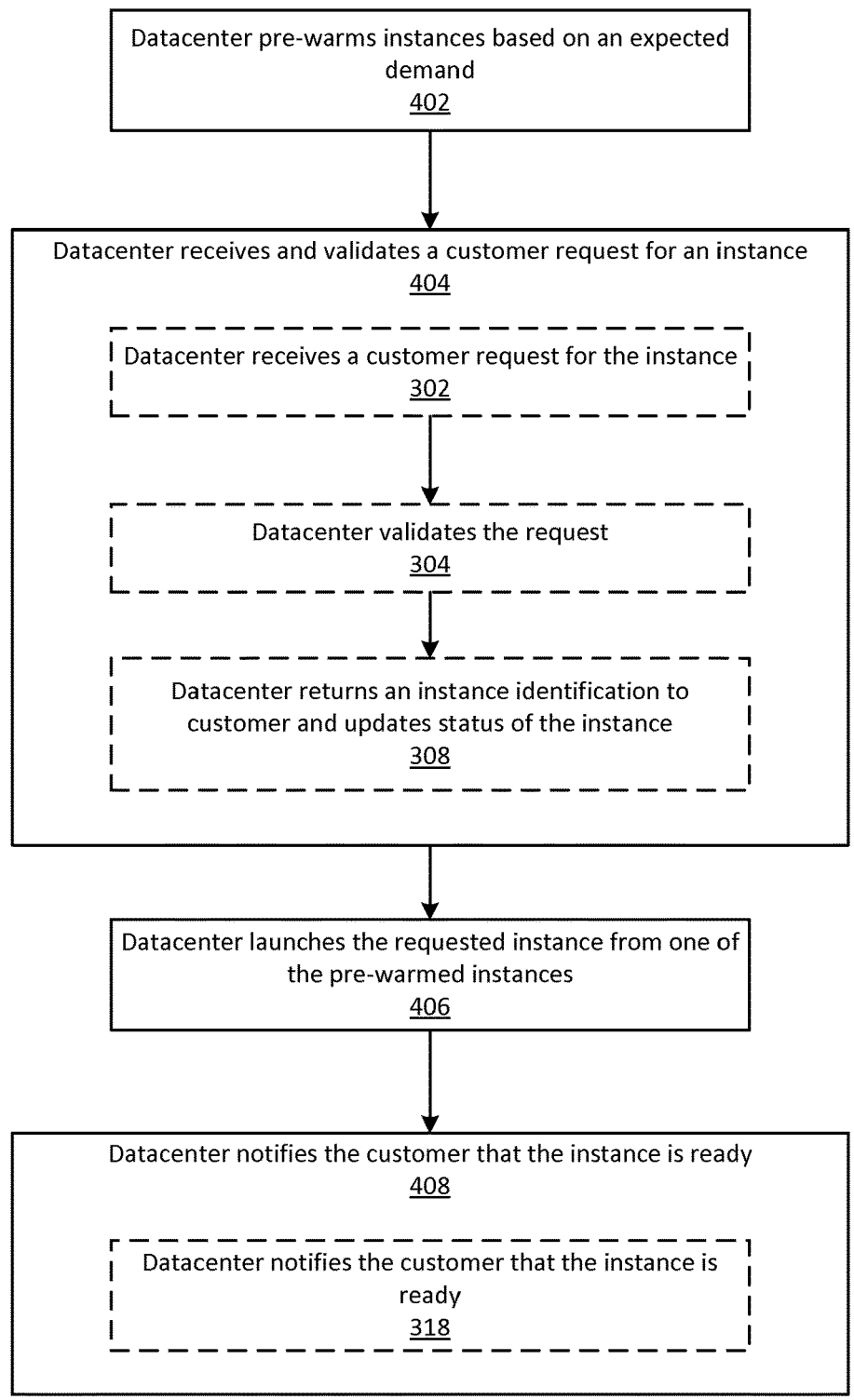
FIG. 4 is a flowchart depicting another example procedure for launching an instance, according to embodiments.

Example procedures for launching an instance in datacenter 102 of FIG. 2 are described in FIGS. 3 and 4. In the interest of clarity of explanation, FIGS. 3 and 4 are described with respect to a single instance associated with a single customer. However, the procedures could also be used in connection with a plurality of instances that may be associated with a plurality of customers. Additionally, instances associated with a single customer can be launched within a single datacenter or across a plurality of datacenters. Furthermore, datacenter 102 and example components of datacenter 102 are described in FIGS. 3 and 4 as performing the example procedure. Nevertheless, other components or combination of components can be used and should be apparent to those skilled in the art.

Generally, in response to receiving a request from customer computing system 104 to launch an instance, datacenter 102 (i.e., computing components in the datacenter as described below) determines if the request could be satisfied using a pre-warmed instance. If so, the datacenter performs the procedure described in FIG. 4; otherwise, it performs the procedure described in FIG. 3. As shown in FIG. 3, when the instance cannot be launched from a pre-warmed instance, datacenter 102 configures its computing resources in response to the request, launches the instance and provides information to allow the customer computing system to establish a connection to the instance. FIG. 3 is presented first to illustrate the general end-to-end process of preparing an instance for operation on a computing device. Thereafter, FIG. 4 is presented to contrast with FIG. 3 to demonstrate the reduction in launch time effectuated when pre-warmed instances are available.

Referring to FIG. 3, operation 302 illustrates datacenter 102 receiving a request from the customer computing system to launch the instance. The request may be in the form of a call to a web API and typically includes information identifying attributes of the customer and attributes of the desired instance. For example, management component 210 can receive a username, password and credentials of the customer along with input parameters that define some configuration attributes of the instance. The input parameters can specify, for example, an identifier of a machine image from which the instance should be launched, a compute instance type (e.g., a type identifier that indicates the amount of hardware resources that will be allocated to the instance, such as a number of processors, an amount of memory, an amount of storage, an amount of network bandwidth, etc.), network security to be applied, storage volume to be associated with the instance and other information. The parameters can also specify, for example, one or more applications or software components that should be installed in the instance, scripts and/or other types of code to be executed in the instance, cache warming logic specifying how an application cache should be prepared and other types of information.

In an embodiment, management component 210 receives the request from the customer computing system in response to providing a list of various instance configurations that the customer can select from. The customer selection may include a machine images offered by the service provider and a compute instance type. In addition, management component 210 allows the customer to select a default or custom network security in the form of, for example, firewall rules that control network traffic that can reach the instance. Other examples of the type of information that the customer can also specify in the request includes a region to launch the instance in, a zone that is within the region, a name of the instance, a number of instances to be launched and so on.

Operation 304 illustrates datacenter 102 validating the request. In an example, management component 210 authenticates the customer based on a digital signature in the API request, the username and password, etc., determines whether the customer has permission to launch the instance based on the credentials of the customer received in the request. If the request is valid, management component 210 requests deployment component 214 to initiate the launch of the instance (shown in operations 308-318 of FIG. 3) or to satisfy the request from a pre-warmed instance (shown in the operations of FIG. 4).

Operation 306 illustrates datacenter 102 determining that the request cannot be satisfied using a pre-warmed instance. This operation can include deployment component 214 determining that none of the pre-warmed instances have attributes that match the attributes of the desired instance. In this case, deployment component 214 and other components of datacenter 102 proceed to launch a new instance for the customer as described in operations 308-318.

Operation 308 illustrates datacenter 102 returning an instance identification to the customer computing system. This operation can include deployment component 214 further validating the request to determine, for example, whether sufficient capacity is available at the datacenter to host the instance. This determination considers various parameters from the request such as, for example, the instance type, the machine image, whether the instance can be hosted on a server computer 202 along with instances of other customers and a profile of the customer that includes its usage pattern. If validated, deployment component 214 generates the instance identification, updates an instance status to pending and returns the information to management component 210. In turn, the management component transmits the instance identification to the customer computing system with an indication of the instance's status and other-instance related information.

Operations 302-308 may be performed synchronously and complete in a few seconds or less. In comparison, the remaining operations for launching the instance usually consume a larger amount of time, e.g., on the order of minutes, and are performed asynchronously.

Operation 310 illustrates datacenter 102 configuring various computing resources to launch the instance. In this operation, deployment component 214 can use the information received in the request to set up the various computing resources to allow a server computer 202 to launch the instance by booting up the machine image. For example, deployment component 214 determines a root storage device that contains the machine image, allocates a block-level persistent storage to the instance, assigns an internet protocol (IP) address to the instance, sets up a network interface, generates routing information, configure firewalls, and attaches other physical and virtual resources to the server computer associated with the instance.

Operation 312 illustrates datacenter 102 determining a host for the instance. This operation involves deployment component 214 determining a particular zone in which to launch the instance and load balancer component 216 determining a particular server computer within that zone where the instance will be placed. Zones are collections of computing resources configured to minimize impacts of failures from one zone to another and allow deployment component 214 and load balancer component 216 to distribute instances across a plurality of server computers and zones. This distribution of instances can be subject to a number of constraints that are associated with, for example, computing resource availabilities, fault tolerances requirements, financial costs for hosting the instances or the like and that may restrict the placement of the instances across the plurality of server computers and zones.

Various parameters can be used to optimize the number of constraints that can be satisfied when placing the instance on a server computer. These parameters may relate to the configuration of the instance, configuration of the server computers, business considerations, fault tolerance requirements and so on. For example, load balancer component 216 considers a particular server computer and determines whether it can support the architecture and network requirements of the instance. The load balancer component also determines the existing instances that are currently running on the particular server computer and verifies that new instance of different customers can be hosted by the same server computer. If the particular server computer meets these requirements, the load balancer assigns the instance to it.

In a further example, the instance and an existing instance hosted on a server computer have the same operating system associated with a vendor. If the vendor charges a licensing fee that does not depend on the number of instances that are hosted on the server computer and that execute its operating system, the load balancer component assigns the instance to this server computer, thereby reducing the financial cost to launch the instance.

In another example, load balancer component 216 assigns the instance to a server computer to meet a targeted density of instances at the server computer. The load balancer also considers whether a large number of other instances are being concurrently launched on the server computer and, if so, selects another server computer to avoid forming a hot spot. When selecting the other server computer, the load balancer considers server computers that are hosting other instances associated with the customer and, if possible, assigns the instance to a server computer that currently does not host any or that hosts the least number of these instances. This selection reduces the impact of a failure of any of the server computers on the customer. Those skilled in the art will recognize that these and other parameters may be combined and used to select a server computer for launching the instance.

Once a server computer is selected, load balancer component 216 passes information about the configuration of the instance to the server computer and passes information about the server computer to deployment component 214. Operation 314 illustrates datacenter 102 calling the host to launch the instance. For example, deployment component 214 sends a command to the server computer to initiate the launch of the instance.

Operation 316 illustrates datacenter 102 launching the instance on the host. In this operation, instance manager 208 executing on the server computer configures a partition in which the instance is launched. For example, the instance manager accesses, caches, decrypts and decompresses the machine image from the root storage device. It also parses configuration files in the machine image and the configuration files according to the configuration parameters of the instance. Next, the instance manager starts the instance which, in turn, mounts and reads the modified machine image, looks for a master boot record and boots the operating system. The instance manager also attaches the storage volume, device interfaces and network interfaces to the instance. When the boot process is complete, applications and other components of the instance are ready for execution and instance manager transmits an indication to management component 210 that the instance is ready to be used by the customer.

Operation 318 illustrates datacenter 102 notifying the customer that the instance is ready by providing information to the customer computing system to allow it to establish a connection to the instance. For example, management component 210 updates the status of the instance to a running status and facilitates a secure connection of the customer computing system to the instance by applying, for example, a secure shell (SSH) protocol using the credentials of the customer. The management component also updates an interface of the customer to reflect the running status of the instance and to instruct the customer to launch a SSH client on its computing system.

As described above, datacenter 102 preforms the procedure of FIG. 4 when it determines that the request can be satisfied from a pre-warmed instance. Generally, datacenter 102 (i.e., computing components in the datacenter as described below) pre-configures and pre-launches the instance prior to receiving the request based on an expected demand for instances. This procedure allows datacenter 102 to minimize the time from when a request for an instance is received to when the customer can use the instance.

Operation 402 illustrates datacenter 102 pre-warming instances based on an expected demand for instances. This operation may involve determining the expected demand and pre-warming instances accordingly. An example procedure for determining the expected demand is further described in FIG. 5 and includes, for example, determining a target for pre-warming instances and configuration parameters of the instances that need to be pre-warmed. This procedure may be implemented as a service hosted at datacenter 102 or as a service hosted outside datacenter 102 and provided to the computing components of datacenter 102.

Once the expected demand is determined, the computing components of datacenter 102 pre-warm these instances based on the corresponding configuration parameters. In general, pre-warming the instances involves pre-configuring and pre-launching the instances on the available computing resources prior to receiving requests for these instances from the customers. The pre-configuration may involve operations similar to operations 310-316 of FIG. 3, such that the computing components pre-configure machine images of the instances and various computing resources based on the corresponding configuration parameters prior to receiving the requests. For example, the pre-configuration includes determining the regions, the zones and the server computers that will host the instances, attaching the root storage devices that store the machine images, allocating the storage volumes to the instances, setting-up the network securities and interfaces and so on. Additionally or alternatively to this example, the computing components may implement the example procedure of FIG. 8 to optimize the pre-configuration by considering the constraints associated with placing the pre-warmed instances on the various computing resources.

The pre-launching operations include accessing, caching, decrypting and decompressing the machine images and modifying their configuration files. An example of this implementation is further described in FIG. 7. In a further example, described in FIG. 6, the pre-launching of the instances also involves launching and idling the instances and swapping the idled instances to the root storage devices.

The computing components can also use other techniques to pre-warm the instances. In an example, the computing components launch and suspend the instances and then restart a number of them in response to the request from the customer. In another example, the computing components launch the instances, generate snapshots of them, store the snapshots on storage volumes, stop the instances and then re-launch a number of them from the corresponding snapshots in response to the request.

Once the instances are pre-warmed, the computing components can manage them for a certain timeframe. For example, the computing components can re-configure the pre-warmed instances in this timeframe based on updates to the configuration parameters of the instances. If the computing components do not launch a pre-warmed instance in response to a request from a customer within the timeframe, they remove the pre-warmed instance and frees up the computing resources that were associated with it. But if the request is received, the computing components next launch the instance as described herein.

Operation 404 illustrates datacenter 102 (e.g., management component 210) receiving and validating a customer request for an instance. This operation may be similar to operations 302, 304 and 308 of FIG. 3 albeit compressed in time. More particularly, the received request includes customer information and configuration parameters associated with the instance. The datacenter (e.g., management component 210) authenticates the customer and determines whether he or she has permission to run the instance based on the customer information. If authenticated and authorized, the datacenter updates the status of the instance to pending and returns an indication of the status and an identification of the instance among other information to the customer. The datacenter also compares the configuration parameters in the request to the configuration parameters of the pre-warmed instances, determines a pre-warmed instance from the pre-warmed instances that can serve the request and sends a request to the server computer associated with the pre-warmed instance to complete the launch of the pre-warmed instance.

Operation 406 illustrates datacenter 102 (e.g., deployment component 214) launching the requested instance from the pre-warmed instance. Generally, operation 406 may include an activation of the pre-warmed instance such that the launch of the instance is complete and the instance is in a running state. This operation may also include an association of the instance with the customer by, for example, applying to the instance the network security and the credentials received in the request. The implementation of this operation depends on the implementation of operation 402. For example, if the pre-warmed instance is idled, the server computer calls the idled instance for execution. Similarly, if the pre-warmed instance is pre-configured and ready to boot, the server computer boots the operating system of the machine image. Likewise, if the instance is suspended, the server computer resumes it or if the server computer had generated a snapshot and stopped the instance, the server computer restarts it from the snapshot.

Operation 408 illustrates datacenter 102 (e.g., management component 210) notifying the customer that the instance is ready by providing information to the customer computing system to allow it to establish a connection to the instance. This operation may be similar to operation 318 of FIG. 3. More particularly, datacenter 102 (e.g., management component 210) updates the status of the instance to running and uses the credentials of the customer to provide information to the customer computing system to allow it to establish a secure connection to the instance.

When requesting an instance for launch, the customer may choose a configuration for the instance from a large pool of available and combinable configuration parameters. For example, the customer has a choice of a machine image from a large number of machine images, a choice of an instance type from a large number of compute instance types and choices of other instance configuration parameters as discussed herein above. Further, each machine image and instance may be customized to specific needs of the customer. Because datacenter 102 may be configured to service a large number of customers, the number and configurations of instances that these customers may request can grow exponentially based at least on the available configuration choices. Thus, it may not be feasible to pre-warm instances based on each configuration choice that can be requested. Instead, a service may be configured to determine the expected demand for instances, determine computing resources expected to be available, balance the expected demand with the expected computing resource availability, and pre-warm the instances accordingly.

Figure 6:
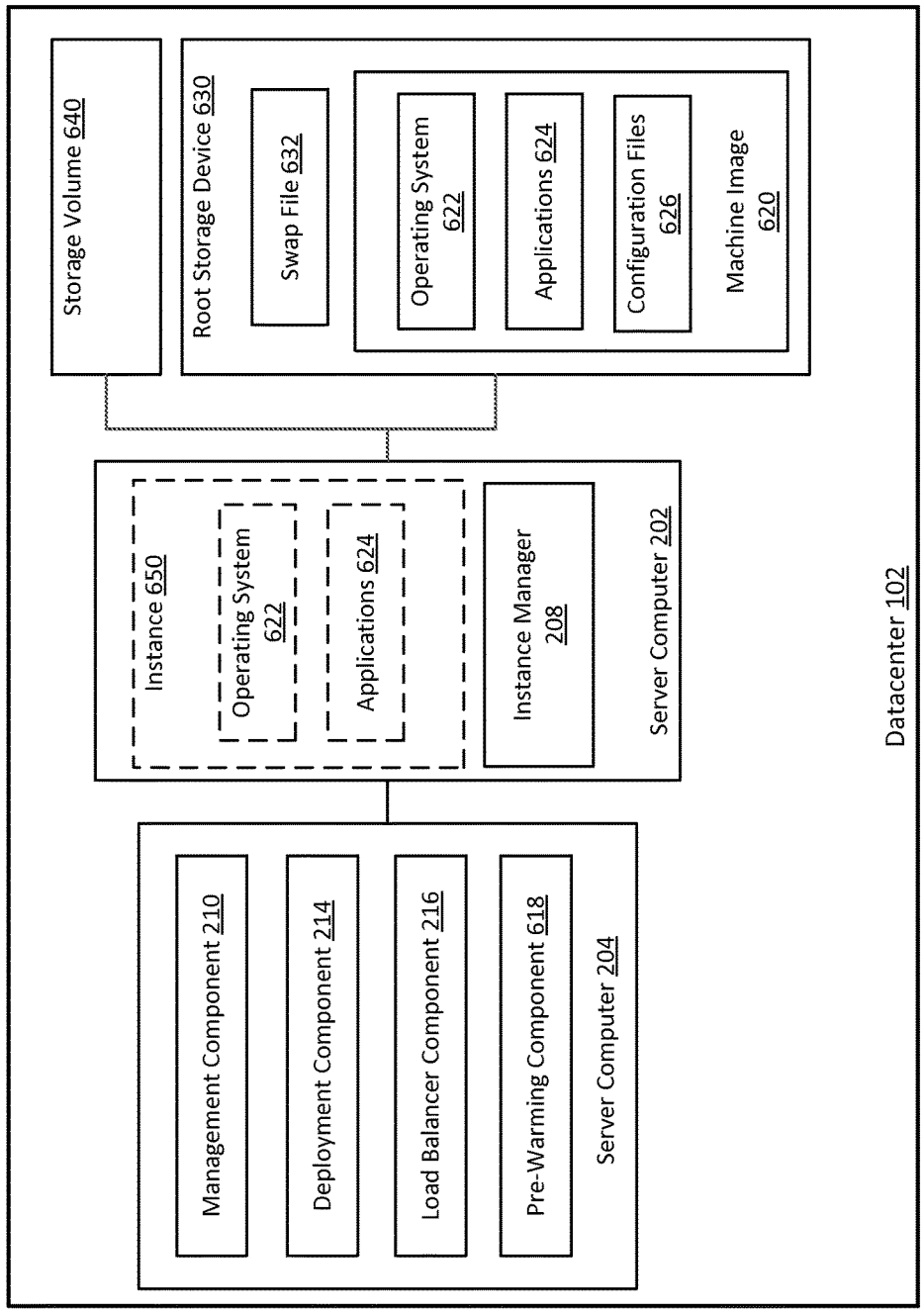
FIG. 6 illustrates an example configuration of a datacenter that pre-warms an instance, according to embodiments.
Figure 7:
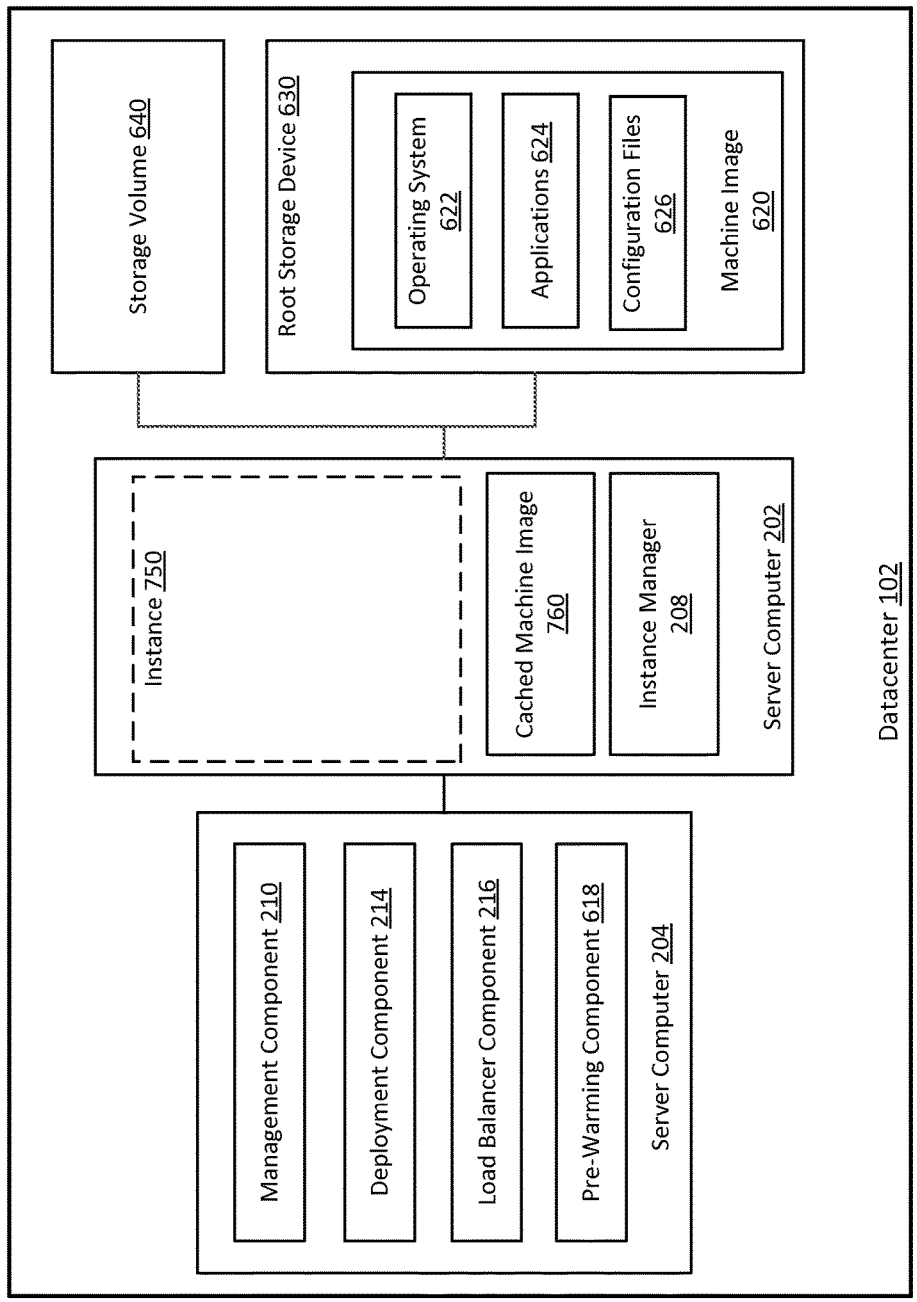
FIG. 7 illustrates another example configuration of a datacenter that pre-warms an instance, according to embodiments.

This service may be hosted at datacenter 102 or at a computing node outside of datacenter 102 (e.g., a server, a computing component at a different datacenter, a third party computing resource or the like). For example, the service can be implemented as a standalone application hosted on server computer 204 or as an application integrated with a computing component of the datacenter such as management component 210 or deployment component 214. An example of a standalone application is shown in FIGS. 6 and 7 as pre-warming component 618. In an alternative example, the service may be configured on the computing node such that the service interfaces with the computing components of datacenter 102, receive the necessary information (further described in FIG. 5) from the computing components, determines the expected demand using the received information and returns information about the expected demand to the computing components.

Figure 5:
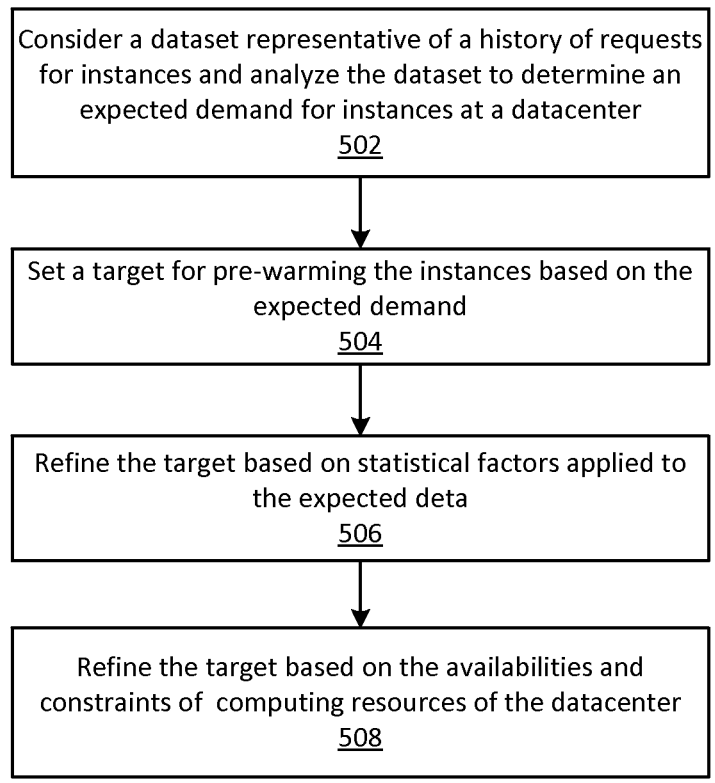
FIG. 5 is a flowchart depicting an example procedure for determining an expected demand, according to embodiments.

Turning to FIG. 5, that figure illustrates an example procedure for determining the expected demand. In the interest of clarity of explanation, the service for determining the expected demand is referred to herein as a pre-warming component that may be configured as a an application within or outside of datacenter 102 as described herein above. Operation 502 illustrates the pre-warming component considering a dataset representative of a history of requests for instances and analyzing the dataset to determine expected requests for instances. The considered dataset can include historical data associated with requested and/or launched instances and data indicative of currently hosted instances. The pre-warming component can select the dataset using a combination of factors such as requested locations, requesting customers, time of requests or the like. For example, the pre-warming component may consider the requests for instances within a specific location (e.g., a region, a zone of availability, etc.), by certain customers (e.g., a particular customer, a number of customers or all of its customers) or over a period of time (e.g., days, weeks, months and even years) depending on how comprehensive the analysis needs to be.

Next, the pre-warming component may analyze the considered dataset by subjecting it to a mathematical model. For example, the pre-warming component can sort the data from the dataset into groups based on machine image and instance type to get a count for each group. Each of the groups may represent a pair of machine image and instance type. The pre-warming component may plot the count for each group over time and determine a mathematical equation that fits the plotted curve using, for example, an extrapolation process. This equation can estimate the expected demand for each group and can be continuously refined over time by considering additional data associated with each group. As such, for a specific pair of machine image and instance type, the pre-warming component may express the expected demand as a function of time (e.g., pre-warm one thousand instances corresponding to the specific instance type and machine image on a first day of a week, two thousands of these instances on a second day of the week, five hundred of these instances on a third day of the week and so on).

The pre-warming component may also apply a similar analysis based on either the instance types or the machine images or based on other configuration parameters of the instances. For example, when datacenter 102 is configured such that specific types of instances can only be hosted on specific computing resources, the pre-warming component may determine the mathematical equations that estimate the expected demand per instance type. These equations can be used to estimate the expected demand for the computing resources that can support the instance types. As such, in this example, the pre-warming component can estimate the needed computing capacity to pre-warm the instances.

Operating 504 illustrates the pre-warming component setting a target for pre-warming the instances. Having estimated the expected demand for the instances, and in some situations, the expected demands for computing resources, the pre-warming component may set the target for pre-warming the instances on the computing resources based on this estimation. This target may include configuration parameters of the instances (e.g., instance types, identifiers of machine images, etc.), the total number of instances, the number of each instance type, the timeframe within which the instances are expected to be requested, the regions and zones within which these instances should be pre-warmed and so on. For example, the analysis of the history of requests can indicate that over one week long periods of time, out of one hundred thousand requested instances, ten thousands were instances that use FEDORA operating system and run APACHE web servers on a 32-bit architecture within a particular datacenter in California. Based on this example analysis, the pre-warming component expects the customers to request ten thousands of these FEDORA/APACHE/32-bit architecture instances to be launched within the particular datacenter in California on a weekly basis. As such, the pre-warming component targets to pre-warm ten thousands of these instances in the particular datacenter.

However, when it may not be feasible to pre-warm instances based on each configuration choice that can be requested (e.g., combination of instance type and machine image), the pre-warming component may further revise the targets associated with the various configuration choices by applying various factors to the expected demand. These various factors can include a combination of statistical factors and considerations of computing resource availabilities and constraints that can used by the pre-warming component to ensure that the targeted instances for pre-warming can be supported by the resources of datacenter 102.

Operation 506 illustrates the pre-warming component refining the target based on various statistical factors applied to the expected demand. In an embodiment, the pre-warming component may revise the target by applying any or a combination of averages, peaks, valleys, thresholds and standard deviations to the analyzed dataset that is associated with the expected demand. Continuing with the previous example to illustrate operation 506, if the pre-warming component determines that over the week long period of time, the FEDORA/APACHE/32-bit architecture instances were requested an average of about one thousand five hundred times a day, the pre-warming component may set that average number as the target for the specific machine image on a daily basis. Similarly, if the pre-warming component determines that within that week long period of time, a maximum number of instances having that specific i configuration were launched at a certain day of the week (e.g., Wednesday) and a minimum number of the same instances were launched at another day (e.g., Friday), the pre-warming component may set the maximum and minimum numbers as the target for the specific instance type over Wednesday and Friday, respectively, of each week. Also, if the pre-warming component determines that within that week long period of time, only a small percentage (e.g., 0.1 percent) of requests are associated with another instance configuration, the pre-warming component may revise its target for pre-warming instances of this configuration type from one percent (e.g., one hundred instances) to zero when the initial target falls below a predefined threshold (e.g., a threshold that requires pre-warming the top ten percent of the most popular configurations of instances).

Operation 508 illustrates the pre-warming component refining the target based on availabilities and constraints of the computing resources of datacenter 102. The pre-warming component may further revise the target to balance the expected demand for the instances and/or computing resources with expected availability of its computing resources. To determine the computing resources that are expected to be available, the pre-warming component may also apply a similar analysis as above to historical uses of its resources. For example, the pre-warming component can determine that over one week long periods of time, the particular datacenter in California runs on average at eighty percent capacity. Thus, the pre-warming component may expect to have twenty percent of available capacity at the datacenter in California on a weekly basis and may reserve this available capacity for pre-warmed instances. To illustrate, if one percent capacity represents the ability to host one hundred instances, the twenty percent available capacity at the datacenter in California amounts to two thousand instances on a weekly basis. Thus, the pre-warming component may revise its target from pre-warming ten thousands of the FEDORA/APACHE/32-bit architecture instances to two thousands of them.

In a further embodiment, the pre-warming component may also analyze any planned outages or maintenances that may affect the resource availability and may update the reserved capacity based on this analysis. For example, if the pre-warming component determines that the particular datacenter in California will be down to ninety percent capacity next week because of a planned maintenance, the pre-warming component may decide to constrain the reserved capacity to ten percent from twenty percent such that the total available computing capacity is not exceeded.

Next, the pre-warming component may further refine its target by also balancing the expected demand for instances and/or computing resources with constraints that may limit the placement of the instances on the computing resources. This balancing is described in FIG. 8 and may be implemented to ensure that the available capacity at the datacenter is not exceeded and to support a balanced distribution of the pre-warmed instances across multiple computing resources and datacenters. Those skilled in the art will recognize that these and other types of analysis may be combined and used to quantify the expected demand and refine the target for pre-warming instances.

Turning to FIG. 6, that figure illustrates an example configuration of datacenter 102 where the pre-warmed instance includes an idled compute instance that can be used in performing the procedure of FIG. 4. Prior to receiving the request for an instance from the customer computing system, various computing resources of datacenter 102 are configured to pre-warm an instance 650 from a machine image 620. For example, server computer 204 executes the pre-warming component (shown as pre-warming component 618 in FIG. 6) to determine the configuration parameters of the pre-warmed instance and executes management component 210, deployment component 214 and load balancer component 216 to select server computer 202 as a host of pre-warmed instance 650 and associate root storage device 630 that contains the machine image, storage volume 640, network interfaces and devices and other resources with the pre-warmed instance.

Although FIG. 6, illustrates pre-warming component 618 as a standalone application hosted on server computer 204, this pre-warming component can be hosted on a computing node outside of datacenter 102 such that the configuration parameters of the pre-warmed instance and information associated with the expected demand are provided to the computing components of the datacenter (e.g., management component 210, deployment component 214, load balancer component 216) as a service as described herein above. Likewise, in another example, pre-warming component 618 may be hosted on a computer server within datacenter 102 and interfacing with server computer 204 such that pre-warming component 618 provides the information associated with the pre-warmed instances to the computing components executed by server computer 204.

To pre-launch the instance, instance manager 208 accesses machine image 620, modifies its configuration files 626 and boots instance 650 from the modified machine image. At this point, instance 650 is launched and instance manager 208 allocates virtual memory to its guest operating system 622. This virtual memory is typically mapped to a physical memory of server computer 202, such as its RAM. Also at this point, instance 650 is not connected to the customer computing system and does not execute applications 624. Thus, until the request is received from the customer computing system, instance 650 is in an idle state.

When the instance manager detects that the instance is idle, it can free up the associated physical memory to other instances running on the server computer by swapping this physical memory to disk. For example, the instance manager stores the content of the associated physical memory to a swap file 632 on root storage device 632 and updates the physical to virtual memory mapping.

The instance remains idle until datacenter 102 receives the request from the customer computing system. Subsequently, management component 210 authenticates the customer and determines whether he or she has permission to use the instance. If so, deployment component 214 determines that the request can be satisfied by using instance 650. Next, deployment component 214 instructs load balancer component 216 to start instance 650. In turn, the load balancer component calls instance manager 208 to activate the instance.

When instance manager 208 receives instructions from the load balancer to activate instance 650, the instance manager loads the swap file to the allocated physical memory, updates the mapping between the physical and virtual memories and allows the instance to use the physical memory by way of the mapped virtual memory. At that point, the instance is considered to be launched and ready to be connected to the customer computing system.

FIG. 7 illustrates another example configuration of datacenter 102 to pre-warm an instance prior to receiving a request for the instance from the customer computing system. In the configuration of FIG. 7, various computing components of the datacenter (e.g., management component 210, deployment component 214, load balancer component 216 and pre-warming component 618) pre-configure an instance 750 on server computer 202 but do not boot it until receiving the request. In an example embodiment, pre-warming component 618 can instruct and cause instance manager 208 to access, cache, decrypt and decompress machine image 620 and parse and modify configuration files 626 based on various parameters associated with pre-warmed instance 750 prior to receiving the request. These parameters include, for example, the configuration parameters of the pre-warmed instance, the hardware and system configuration of server computer 202, the addressing of the attached storage volume, network interfaces and so on. The modified and cached machine image is shown as machine image 760 in FIG. 7.

Once the request for the instance is received, management component 210 authenticates and authorizes the customer to launch the instance. Next, deployment component 214 determines that the request can be satisfied from pre-warmed instance 750 and instruct load balancer component 216 to complete a launch of the pre-warmed instance. In turn, the load balancer component calls server computer 202 to activate the pre-warmed instance. Instance manager 208 of the server computer mounts and reads the pre-configured machine image 760 and boots its operating system. Once the boot is complete, the instance is considered to be launched and can be connected to the customer computing system.

Although operations 404-408 of FIG. 4 and the systems of FIGS. 6 and 7 are described herein above in the context of a single instance, they also apply to a larger number of instances, in the order of hundreds and thousands and more. Also, in addition to setting a target for pre-warming instances based on an expected demand, the various computing components (e.g., pre-warming component 618, deployment component 214) may place the pre-warmed instances on particular server computers by considering the constraints associated with placing them on the server computers.

Figure 8:
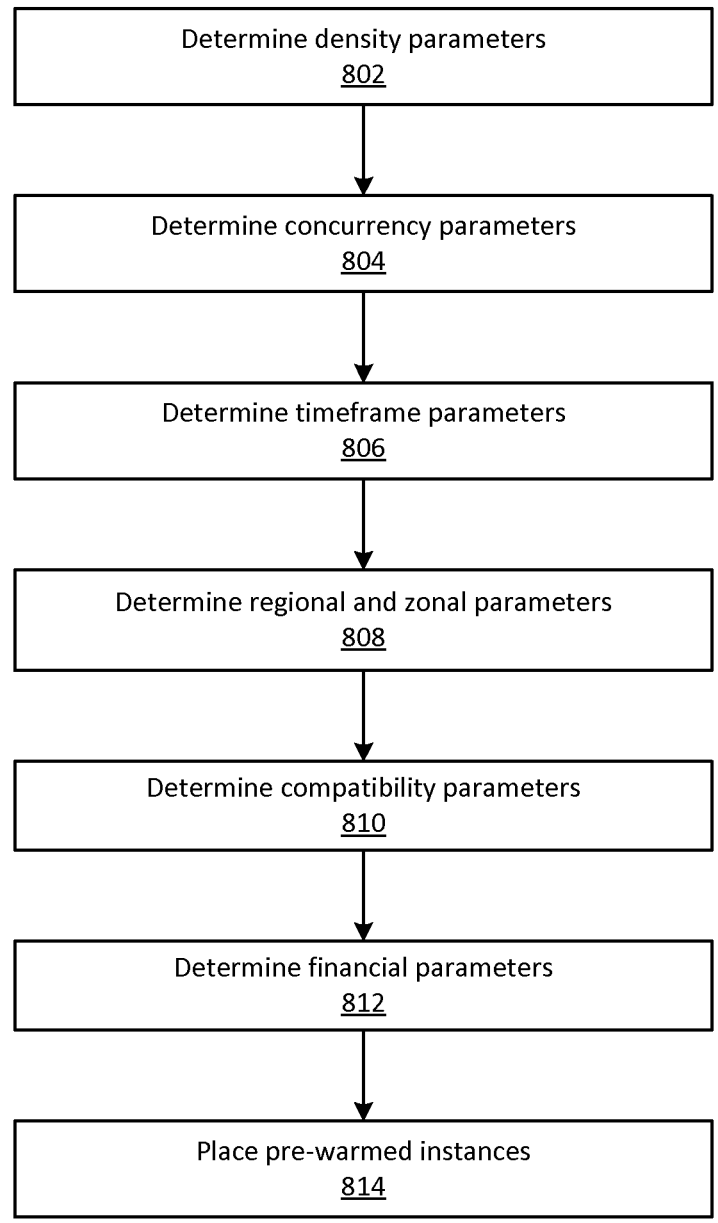
FIG. 8 is a flowchart depicting an example procedure for placing a pre-warmed instance on a computing resource, according to embodiments.

FIG. 8 is an example of such a procedure and is implemented to optimize uses of computing resources and financial costs. In the interest of clarity of explanation, pre-warming component 618 is described as performing the example procedure of FIG. 8. Nevertheless, other components or combination of components of datacenter 102 can be used and should be apparent to those skilled in the art.

Operation 802 illustrates pre-warming component 618 determining density parameters that indicate the available capacity at the various server computers. Pre-warming component 618 uses these parameters to target density such that the server computers are efficiently used (e.g., target a high capacity use) and such that impacts of failures within and across the server computers are reduced (e.g., pre-warmed instances of a particular customer should be distributed across multiple server computers).

Operation 804 illustrates pre-warming component 618 determining concurrency parameters that indicate the number of instances that are being concurrently pre-warmed at a server computer. Pre-warming component 618 uses these parameters to avoid forming hot spots associated with pre-warming a large number of instances within a short period of time on a single server computer.

Operation 806 illustrates pre-warming component 618 determining a timeframe within which the pre-warmed instance should be available to the customers. This timeframe typically depends on various parameters that are associated, for example, with the available capacity and the corresponding period of availability. Once the timeframe is set, if the available capacity decreases or if datacenter 102 receives new traffic that was unexpected, the timeframe can be shortened. Likewise, if the available capacity increases or if planned traffic unexpectedly decreases, the timeframe can be lengthened.

Operation 808 illustrates pre-warming component 618 determining regional and zonal parameters that indicate resource availability across multiple zones and/or regions. Pre-warming component 618 uses these parameters to distribute the pre-warmed instances to server computers across multiple zones and regions such that impacts of failures within one of the regions or zones on the customers are minimized. This operation can also involve pre-warming component 618 determining compatibilities of the server computers to best support the pre-warmed instances. For example, the pre-warmed instances can require a particular networking interface available in only one region. In this example, pre-warming component 618 places the pre-warmed instances on server computers within that region.

Operation 808 illustrates pre-warming component 618 determining compatibility parameters that indicate the computing resources that can support the pre-warmed instances. Pre-warming component 618 may use these parameters when datacenter 102 is configured such that specific types of instances can only be hosted on specific computing resources. As such, in this operation, the pre-warming component can determine the server computers that can actually support the pre-warmed instances and can proactively place the pre-warmed instances on these server computers to ensure that compatibility is met between the configuration of the pre-warmed instances and the configuration of the computer servers.

Operation 812 illustrates pre-warming component 618 determining financial parameters that indicate a financial cost associated with pre-warming the instances. For example, a vendor of a particular operating system can charge a licensing fee on a per-server computer basis rather than a per-instance basis. In other words, regardless of how many instances that execute the particular operating system are hosted on the server computer, the charge remains flat. In such an example, the pre-warming component places pre-warmed instances that execute the particular operating system on a server computer that already hosts an instance with that particular operating system to avoid incurring additional licensing fee charges.

Operation 814 illustrates pre-warming component 618 placing the pre-warmed instances on the server computers. In this operation, pre-warming component 618 combines the above parameters to optimize the deployment of the instances. This optimization may include prioritizing and maximizing the number of constraints associated with placing the pre-warmed instances on the server computers. Once selected, pre-warming component 618 initiates the deployment of the pre-warmed instances on these computer resources as described in the procedure of FIG. 4.

Figure 9:
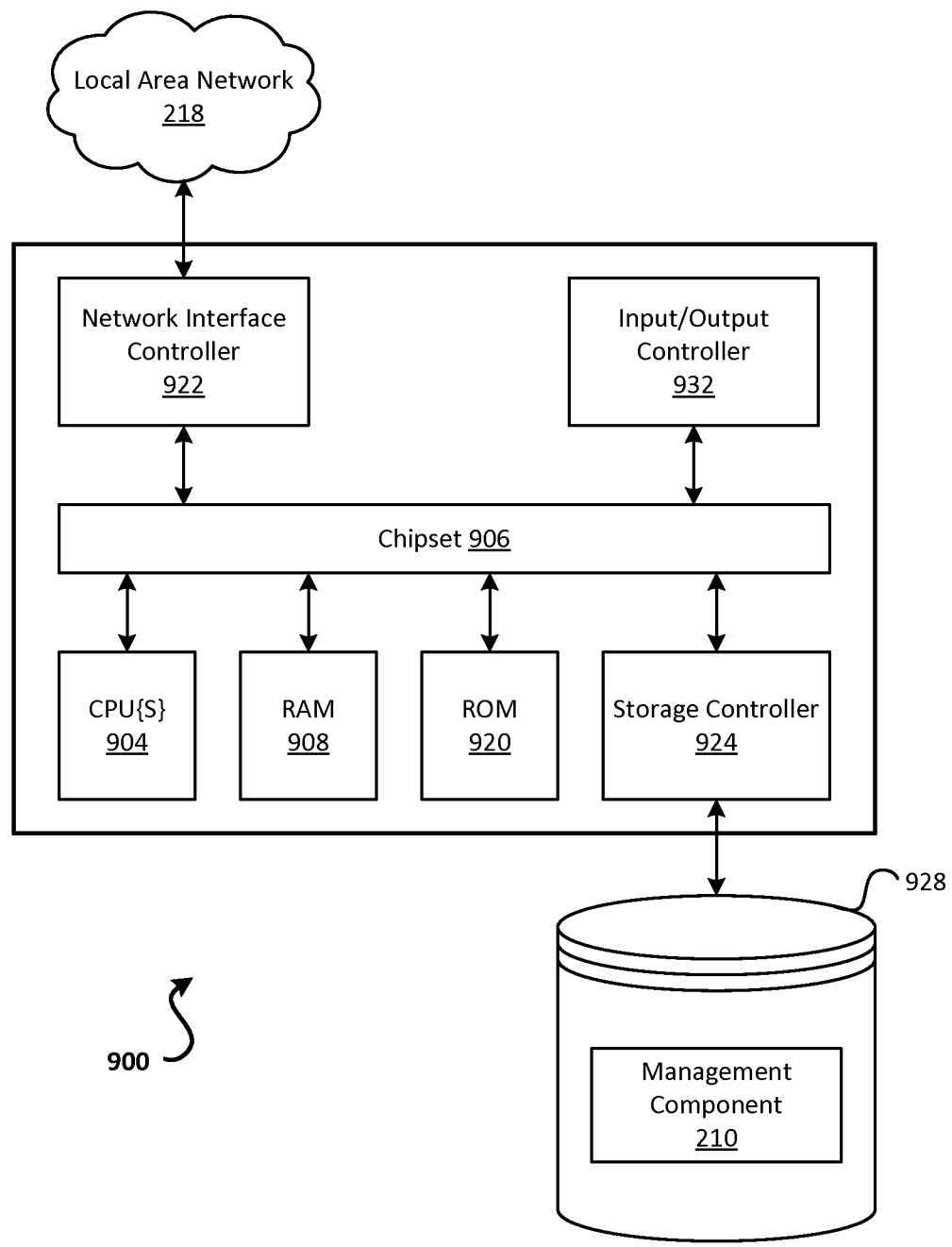
FIG. 9 illustrates an example computer hardware architecture for implementing various computing devices described in embodiments presented herein.

Turning to FIG. 9, this figure shows an example computer architecture for a computer 800 capable of executing the above-described software components. The computer architecture shown in FIG. 9 illustrates a conventional server computer, workstation, desktop computer, laptop, tablet, network appliance, PDA, e-reader, digital cellular phone or other computing device, and may be utilized to execute any aspects of the software components presented herein described as executing within datacenters 102, on server computers 202, on the customer computing system 104 or on any other computing system mentioned herein.

Computer 900 may include a baseboard, or "motherboard," which is a printed circuit board to which a multitude of components or devices may be connected by way of a system bus or other electrical communication paths. One or more central processing units ("CPUs") 904 may operate in conjunction with a chipset 906. CPUs 904 may be standard programmable processors that perform arithmetic and logical operations necessary for the operation of computer 900.

CPUs 904 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 906 may provide an interface between CPUs 904 and the remainder of the components and devices on the baseboard. Chipset 906 may provide an interface to a random access memory ("RAM") 908, used as the main memory in computer 900. Chipset 906 may further provide an interface to a computer-readable storage medium such as a read-only memory ("ROM") 920 or non-volatile RAM ("NVRAM") for storing basic routines that may help to startup computer 900 and to transfer information between the various components and devices. ROM 920 or NVRAM may also store other software components such as computer-readable instructions necessary for the operation of computer 900 in accordance with the embodiments described herein.

Computer 900 may operate in a networked environment using logical connections to remote computing devices and computer systems through network 218. Chipset 906 may include functionality for providing network connectivity through a network interface controller ("NIC") 922, such as a gigabit Ethernet adapter. NIC 922 may be capable of connecting the computer 900 to other computing devices over network 218. It should be appreciated that multiple NICs 922 may be present in computer 900, connecting the computer to other types of networks and remote computer systems.

Computer 900 may be connected to a mass storage device 928 that provides non-volatile storage for the computer. Mass storage device 928 may store system programs, application programs, other program modules and data, which have been described in greater detail herein. Mass storage device 928 may be connected to computer 900 through a storage controller 924 connected to chipset 906. Mass storage device 928 may consist of one or more physical storage units. Storage controller 924 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer 900 may store data on mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units, whether mass storage device 928 is characterized as primary or secondary storage and the like.

For example, computer 900 may store information to mass storage device 928 by issuing instructions through storage controller 924 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 900 may further read information from mass storage device 928 by detecting the physical states or characteristics of one or more particular locations within the physical storage units.

In addition to mass storage device 928 described above, computer 900 may have access to other computer-readable storage media to store and retrieve information, such as program modules, data structures or other data. It should be appreciated by those skilled in the art that computer-readable storage media can be any available media that provides for the storage of non-transitory data and that may be accessed by computer 900.

By way of example and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices or any other medium that can be used to store the desired information in a non-transitory fashion.

Mass storage device 928 may store an operating system utilized to control the operation of the computer 900. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 928 may store other system or application programs and data utilized by computer 900, such as management component 210 and/or the other software components described above.

Mass storage device 928 or other computer-readable storage media may also be encoded with computer-executable instructions, which, when loaded into computer 900, transforms the computer from a general-purpose computing system into a special-purpose computer capable of implementing the embodiments described herein. These computer-executable instructions transform computer 900 by specifying how CPUs 904 transition between states, as described above. Computer 900 may have access to computer-readable storage media storing computer-executable instructions, which, when executed by computer 900, perform the procedures described with regard to FIGS. 3 and 4.

Computer 900 may also include an input/output controller 932 for receiving and processing input from a number of input devices, such as a keyboard, a mouse, a touchpad, a touch screen, an electronic stylus or other type of input device. Similarly, input/output controller 932 may provide output to a display, such as a computer monitor, a flat-panel display, a digital projector, a printer, a plotter or other type of output device. It will be appreciated that computer 900 may not include all of the components shown in FIG. 9, may include other components that are not explicitly shown in FIG. 9 or may utilize an architecture completely different than that shown in FIG. 9.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for provisioning and launching compute instances, the system comprising:
   one or more datacenters comprising a plurality of computing devices configured to communicate with each other over network connections; and
   one or more memories having stored therein computer-readable instructions that, upon execution on the system, cause the system at least to:
      determine an expected demand for a plurality of compute instances, the plurality of compute instances being associated with a plurality of machine images and a plurality of compute instance types;
      determine one or more computing devices from the plurality of computing devices configured to host the plurality of compute instances based at least in part on the expected demand that customers are expected to request and an expected availability of the plurality of computing devices to be available to host the expected demand;
      prior to receiving a request from a customer node to launch a compute instance, launch and idle the plurality of compute instances on the one or more computing devices based at least in part on the plurality of machine images and the plurality of compute instance types; and
      in response to receiving the request from the customer node to launch the compute instance, activate the compute instance from one of the plurality of machine images that are idle on the one or more computing devices.

2. The system of claim 1, wherein the expected demand is determined based at least in part on a history of requests received from customer nodes, and wherein the history of requests is sorted based at least in part on configuration parameters of compute instances associated with the requests.

3. The system of claim 1, wherein the instructions to determine an expected demand for a plurality of compute instances comprise instructions that, upon execution on the system, cause the system at least to:
   analyze a history of requests for compute instances to determine a target for the plurality of compute instances and the one or more computing devices; and
   revise the target based at least in part on statistical factors associated with the requests.

4. The system of claim 1, wherein the instructions to determine one or more computing devices from the plurality of computing devices comprise instructions that, upon execution on the system, cause the system at least to:
   balance the expected demand with the expected availability to meet a constraint associated with launching and idling the plurality of compute instances; and
   determine the one or more computing devices based at least in part on the balance.

5. A method, comprising:
   providing a plurality of pre-configured machine images on a plurality of compute nodes, wherein the plurality of pre-configured machine images is based at least in part on an expected demand that customers are expected to request and an expected availability of the plurality of compute nodes to be available to host the preconfigured machine images;
   launching the compute instance prior to receiving the request from a user node;
   idling the launched compute instance prior to receiving the request from the user node;
   after receiving a request from the user node to launch a compute instance, determining that the compute instance is associated with at least a type of machine image of the plurality of pre-configured machine images; and
   completing a launch of the compute instance using the associated type of machine image on a compute node of the plurality of compute nodes based at least in part on the determination by activating the idled compute instance in response to receiving the request from the user node.

6. The method of claim 5, wherein the expected demand is based at least in part on previously received requests for compute instances.

7. The method of claim 5, wherein the expected demand comprises types of a plurality of compute instances associated with the plurality of pre-configured machine images and identifiers associated with the plurality of pre-configured machine images.

8. The method of claim 7, wherein the expected demand further comprises a timeframe within which requests for the plurality of compute instances from user nodes are expected to be received and regions expected to be indicated in the requests from the user nodes.

9. The method of claim 5, wherein the machine image is pre-configured for launch on the compute node based at least in part on:
   caching the machine image from a root storage device that stores the machine image;
   modifying a configuration file of the machine image based at least in part on a configuration of the compute instance; and
   allocating a storage volume to the compute instance based at least in part on the configuration of the compute instance.

10. The method of claim 9, wherein the completing a launch of the compute instance comprises booting an operating system of the machine image on the compute node based at least in part on the configuration file that is modified.

11. A non-transitory computer-readable medium comprising instructions that, upon execution on a system, cause the system to perform operations comprising:
   determining a demand for a plurality of compute instances associated with a plurality of machine images wherein the demand for the plurality of compute instances is associated with expected requests for launching the plurality of compute instances and an expected availability of the plurality of compute nodes to be available to host the compute instances;
   determining a plurality of compute nodes configured to launch the plurality of compute instances from the plurality of machine images, the determining being based at least in part on a constraint associated with launching the plurality of compute instances on the plurality of compute nodes;
   configuring the plurality of machine images on the plurality of computing nodes prior to receiving a request from a user node to launch a compute instance of the plurality of compute instances; and
   after receiving the request from the user node, completing a launch of a specific type of compute instance using one of the plurality of configured machine images on one of the plurality of compute nodes.

12. The non-transitory computer-readable medium of claim 11 further comprising instructions that, upon execution on the system, cause the system to perform operations comprising:
   analyzing a history associated with launched instances to determine a plurality of configuration parameters associated with the expected requests for launching plurality of compute instances;
   determining a target associated with launching the plurality of compute instances on a plurality of compute nodes based at least in part on availabilities of the plurality of compute nodes; and
   setting the demand based at least in part on the target, the demand comprising one or more configuration parameters from the plurality of configuration parameters.

13. The non-transitory computer-readable medium of claim 12, wherein the plurality of configuration parameters include a number of the plurality of compute instances, types of the plurality of compute instances, and identifiers of the plurality of machine images.

14. The non-transitory computer-readable medium of claim 12, wherein the history is based at least in part on requests for the launched instances associated with a plurality of user nodes, wherein the launched instances are hosted at a specific location.

15. The non-transitory computer-readable medium of claim 11, wherein the constraint is based at least in part on an available compute capacity at the plurality of compute nodes.

16. The non-transitory computer-readable medium of claim 11, wherein the constraint is based at least in part on a number of compute instances configured to be concurrently launched on a compute node of the plurality of compute nodes.

17. The non-transitory computer-readable medium of claim 11, wherein the constraint is based at least in part on availabilities of compute nodes across a zone or a region.

18. The non-transitory computer-readable medium of claim 11, wherein the constraint is based at least in part on a fee associated with executing an application or an operating system associated with one of the plurality of machine images.

19. The non-transitory computer-readable medium of claim 11, wherein the constraint is based at least in part on a fee associated with launching one of the plurality of compute instances from one of the plurality of machine images on one of the plurality of compute nodes.

20. The non-transitory computer-readable medium of claim 11, wherein the constraint is based at least in part on compatibilities of the plurality of compute nodes for launching the plurality of compute instances.

21. The system of claim 1, wherein the one or more memories having stored therein computer-readable further comprise instructions that, upon execution on the system, cause the system at least to:
   balance the distribution of the compute instances across the plurality of computing devices based on the expected availability.

* * * * *